(12) United States Patent
Lee et al.

(10) Patent No.: US 12,358,824 B2
(45) Date of Patent: Jul. 15, 2025

(54) DEWATERING MACHINE CAPABLE OF CONTROLLING MOISTURE CONTENT

(71) Applicant: Korea Institute of Machinery & Materials, Daejeon (KR)

(72) Inventors: Gi Chun Lee, Daejeon (KR); Tae Yeon Nam, Daejeon (KR); Yong-Bum Lee, Daejeon (KR); Jong-Won Park, Daejeon (KR); Dong Cheon Baek, Daejeon (KR); Hak Yong Eom, Daejeon (KR); Jong Sik Choi, Daejeon (KR); Kye Suk Lee, Daejeon (KR); Chung Kwang Yang, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 168 days.

(21) Appl. No.: 17/795,776

(22) PCT Filed: Jun. 24, 2021

(86) PCT No.: PCT/KR2021/007983
§ 371 (c)(1),
(2) Date: Jul. 27, 2022

(87) PCT Pub. No.: WO2021/261945
PCT Pub. Date: Dec. 30, 2021

(65) Prior Publication Data
US 2023/0077658 A1 Mar. 16, 2023

(30) Foreign Application Priority Data
Jun. 26, 2020 (KR) .................. 10-2020-0078260

(51) Int. Cl.
*B30B 9/14* (2006.01)
*B04B 1/20* (2006.01)
(Continued)

(52) U.S. Cl.
CPC .............. *C02F 11/125* (2013.01); *B04B 1/20* (2013.01); *B30B 9/14* (2013.01); *C02F 2103/20* (2013.01)

(58) Field of Classification Search
CPC .. B30B 9/14; B30B 9/26; B30B 9/267; B30B 9/121; C02F 11/125; C02F 2103/20; B04B 1/20; Y02A 40/20; Y02P 20/145
See application file for complete search history.

(56) References Cited

U.S. PATENT DOCUMENTS 4,002,322 A * 1/1977 Matsubara .......... E04F 11/1804
256/65.06
4,279,197 A * 7/1981 Hunt ...................... B30B 9/125
100/98 R
(Continued)

FOREIGN PATENT DOCUMENTS

JP 2002361489 A * 12/2002 ............. B30B 9/122
JP 2003062694 A * 3/2003 ............... B30B 9/12
(Continued)

OTHER PUBLICATIONS

English translation of WO-2014017707A1, 9 pages, retrieved on May 2024. (Year: 2024).*
(Continued)

*Primary Examiner* — Jimmy T Nguyen
(74) *Attorney, Agent, or Firm* — Harness, Dickey & Pierce, P.L.C.

(57) ABSTRACT

A dewatering machine includes a screen, a screw and at least one moisture content control wing. The screen has a hollow inside, has an inlet portion through which livestock manure is inputted at a first side and an outlet portion through which dehydrated livestock manure is outputted at a second side, and has a plurality of moisture exhaust holes penetrating from an inside of the screen to an outside of the screen. The screw includes a rotation axis and a main wing formed into
(Continued)

a spiral shape along a longitudinal direction of the rotation axis. At least one moisture content control wing is disposed between the main wings adjacent to the outlet portion, and is formed into a spiral shape along the longitudinal direction of the rotation axis.

15 Claims, 13 Drawing Sheets

(51) Int. Cl.
  *C02F 11/125* (2019.01)
  *C02F 103/20* (2006.01)

(56) References Cited

U.S. PATENT DOCUMENTS

| | | | | |
|---|---|---|---|---|
| 5,188,023 | A * | 2/1993 | Mansfield | B22D 19/16 |
| | | | | 100/145 |
| 10,654,235 | B2 * | 5/2020 | Miller | C02F 11/125 |
| 2013/0312624 | A1 * | 11/2013 | Cone | B30B 9/125 |
| | | | | 100/37 |

FOREIGN PATENT DOCUMENTS

| | | | | | |
|---|---|---|---|---|---|
| JP | 2004-148342 | A | | 5/2004 | |
| JP | 2004-195524 | A | | 7/2004 | |
| JP | 2013059781 | A | * | 4/2013 | ............... B30B 9/12 |
| KR | 2005-0076290 | A | | 7/2005 | |
| KR | 200404130 | Y1 | | 12/2005 | |
| KR | 100912781 | B1 | | 8/2009 | |
| KR | 100945837 | B1 | | 3/2010 | |
| KR | 10-2011-0093230 | A | | 8/2011 | |
| KR | 101188740 | B1 | * | 10/2012 | ............... B30B 9/14 |
| KR | 101369416 | B1 | | 2/2014 | |
| KR | 101663827 | B1 | * | 10/2016 | ............... B30B 9/14 |
| KR | 2020-0061138 | A | | 6/2020 | |
| WO | WO-2014017707 | A1 | * | 1/2014 | ........... B01D 33/073 |

OTHER PUBLICATIONS

English translation of JP-2002361489A, 14 pages, retrieved on May 2024. (Year: 2024).*
International Search Report for International Application No. PCT/KR2021/007983 dated Oct. 1, 2021.
Extended European Search Report dated Aug. 26, 2024 issued in European Patent Application No. 21828052.7-1017.

* cited by examiner

DEWATERING MACHINE CAPABLE OF CONTROLLING MOISTURE CONTENT

CROSS-REFERENCE TO RELATED APPLICATIONS

This application is a national phase under 35 U.S.C. § 371 of PCT International Application No. PCT/KR2021/007983 which has an International filing date of Jun. 24, 2021, which claims priority to Korean Patent Application No. 10-2020-0078260, filed Jun. 26, 2020, the entire contents of each of which are hereby incorporated by reference.

BACKGROUND OF THE INVENTION

Technical Field

Exemplary embodiments of the present invention relate to a dewatering machine used for removing moisture from livestock manure and capable of controlling moisture content.

Discussion of the Related Art

Livestock manure refers to excrement from cow, cattle, pigs, chickens, etc., and livestock manure has various moisture content, such as high and low moisture content.

The livestock manure is used by composting after removing a certain amount of moisture using a dewatering device.

However, conventionally, the livestock manure dehydrated using the dewatering device has a moisture content of about 60% to 70%, and thus the livestock manure does not meet the conditions for composting.

Thus, a device capable of controlling the moisture content when dehydrating livestock manure is required, in order to lower the moisture content of the dehydrated livestock manure to 50% or less for composting of the livestock manure.

Related prior art is Korean patent No. 10-0912781.

SUMMARY

Exemplary embodiments of the present invention provide a dewatering machine capable of easily removing moisture from livestock manure having a fiber, and capable of easily controlling moisture content of dehydrated livestock manure.

According to one aspect of the present invention, a dewatering machine includes a screen, a screw and at least one moisture content control wing. The screen has a hollow inside, has an inlet portion through which livestock manure is inputted at a first side and an outlet portion through which dehydrated livestock manure is outputted at a second side, and has a plurality of moisture exhaust holes penetrating from an inside of the screen to an outside of the screen. The screw includes a rotation axis and a main wing formed into a spiral shape along a longitudinal direction of the rotation axis. At least one moisture content control wing is disposed between the main wings adjacent to the outlet portion, and is formed into a spiral shape along the longitudinal direction of the rotation axis.

In an example, the moisture content control wing may be detachably coupled with the rotation axis.

In an example, the moisture content control wing may be coupled with a guide groove which is concavely formed along a spiral direction at the rotation axis.

In an example, the moisture content control wing may include a blade outwardly protruded from the rotation axis, and an inserted portion extending from the blade and inserted into the guide groove.

In an example, each of the guide groove and the inserted portion may have a width increasing toward an inside of the rotation axis.

In an example, the moisture content control wing may have at least one wing piece.

In an example, the moisture content control wing may include at least one infill block, and the infill block may fill a remaining space in the guide groove, after the wing piece is coupled with the guide groove.

In an example, the moisture content control wing may include a variable pin, and the number of the variable pins coupled with the rotation axis may be changed considering moisture content of the livestock manure.

In an example, the moisture content control wing may further include a fixing block fixed to the rotation axis. The variable pin may be added to the fixing block, to be coupled with the rotation axis, with changing the number of the variable pins considering the moisture content of the livestock manure.

In an example, the moisture content control wing may be a plural, and the plurality of the moisture content control wings may be spaced apart from each other along a circumferential direction.

In an example, the moisture content control wing may be formed into a spiral shape and may have a width increasing toward the outlet portion.

In an example, the screw may include a first body and a second body detachably coupled with the first body. The second body may include a rotation axis to which the moisture content control wing is coupled.

In an example, each of the moisture exhaust holes may extend with a slot shape along an extending direction of the screen. The moisture exhaust holes may be spaced apart from each other along a circumferential direction of the screen.

In an example, the screen may include a plurality of wedge wires extending along the extending direction of the screen and spaced apart from each other along the circumferential direction of the screen, and a supporting part fixing the wedge wires with each other.

In an example, a width of the wedge wire may decrease toward an outside of the wedge wire.

In an example, a cross-sectional shape of the wedge wire may be a triangle, and one side of the triangle may be disposed at an inside of the wedge wire.

According to some exemplary embodiments of the present invention, the dewatering machine may easily remove moisture from livestock manure having a fiber, and may easily control moisture content of dehydrated livestock manure.

<reference numerals>

| 100: housing | 110: inlet part | 120: outlet part | 200: screen |
|---|---|---|---|
| 210: wedge wire | | 220: supporting part | |
| 230: moisture exhaust hole | | 240: inlet portion | |
| 250: outlet portion | | 260: first body part | |
| 270: second body part | | 300: screw | |
| 310: rotation axis | | 320: main wing | |
| 330: bearing | | 340: driving part | |
| 360: first body | | 370: second body | |
| 400, 401, 402, 403: moisture content control wing | | | |
| 400a: moisture content control wing piece | | 400b: infill block | |
| 400c: variable pin | | 400d: fixing block | |
| 410: blade | | 420: inserted portion | |
| 430: intro portion | | | |
| A: livestock manure | | B: dehydrated livestock manure | |

DETAILED DESCRIPTION OF THE INVENTION

Hereinafter, the present invention will be explained in detail with reference to the accompanying drawings.

Figure 1:
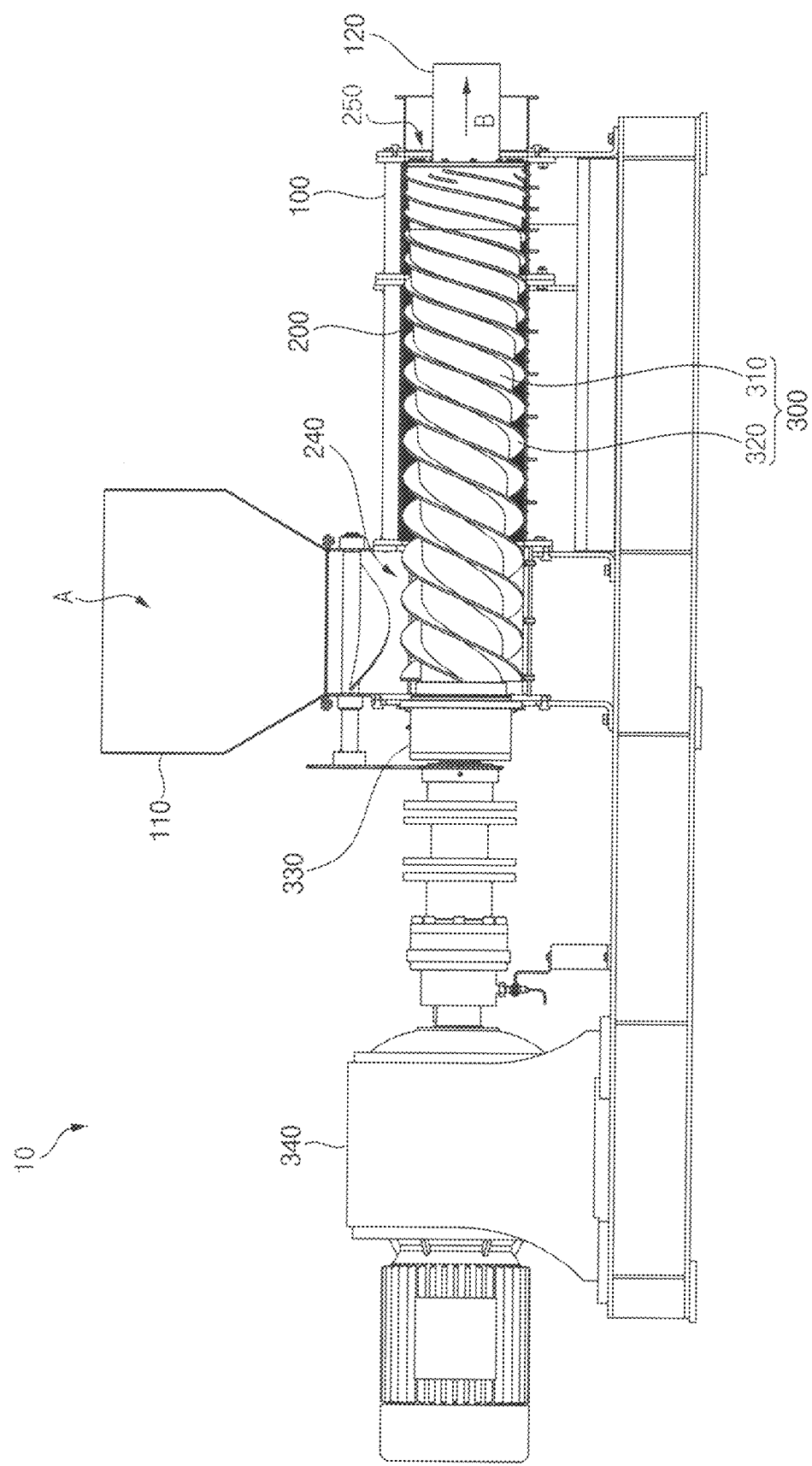
FIG. 1 is a front view illustrating a dewatering machine capable of controlling moisture content according to an example embodiment of the present invention.
Figure 2:
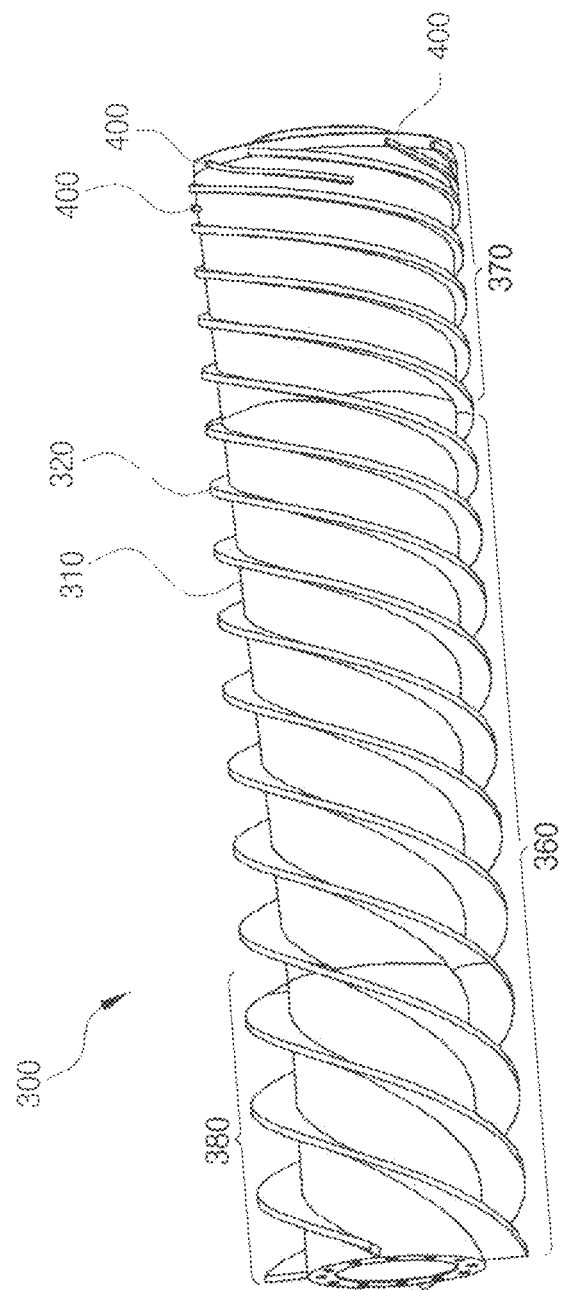
FIG. 2 is a perspective view illustrating a screw of FIG. 1.

FIG. 1 is a front view illustrating a dewatering machine capable of controlling moisture content according to an example embodiment of the present invention. FIG. 2 is a perspective view illustrating a screw of FIG. 1.

Referring to FIG. 1 and FIG. 2, the dewatering machine capable of controlling moisture content according to the present example embodiment (hereinafter, the dewatering machine 10) includes a screen 200, a screw 300 and a moisture content control wing 400, and may further include a housing 100 and a driving part 340.

The housing 100 has a hollow shape. An inlet part 110 having a hopper shape is formed at an upper portion of a first side of the housing 100, and livestock manure A is inputted into the inlet part 110. An outlet part 120 is formed at a second side of the housing 100, and dehydrated livestock manure B is outputted from the outlet part 120. Here, although not shown in the figure, the outlet part 120 may extend downwardly further, and thus the dehydrated livestock manure B may be exhausted downwardly.

The screen 200 has a cylindrical shape, and is disposed inside of the housing 100. An outside of the screen 200 is spaced apart from the housing 100 and is coupled and fixed with the housing 100.

The screen 200 may have a hollow cylindrical shape. An inlet portion 240 through which the livestock manure A is inputted is formed at a first side of the screen 200, and an outlet portion 250 through which the dehydrated livestock manure B is outputted is formed at a second side of the screen 200. A plurality of moisture exhaust holes 230 (referring to FIG. 15) is formed through the screen 200, and the moisture exhaust holes 230 penetrate from an inside of the screen 200 to an outside of the screen 200.

In addition, the inlet portion 240 of the screen 200 is connected to the inlet part 110 of the housing 100, and the outlet portion 250 of the screen 200 is connected to the outlet part 120 of the housing 100.

The screw 300 includes a rotation axis 310 and a main wing 320.

The rotation axis 310 has a diameter gradually increasing from a first side of the rotation axis 310 to a second side of the rotation axis 310, and thus the diameter of the inlet portion 240 is smaller than that of the outlet portion 250.

The main wing 320 has a pitch gradually decreasing from a first side of the main wing 320 to a second side of the main wing 320. An outer diameter of the main wing 320 which is a distance to an end of the main wing 320 along a radial direction with respect to a central axis of the rotation axis 310, may be uniform from the first side of the main wing 320 to the second side of the main wing 320. Thus, with maintaining an outer radius of the screw 300 uniformly from the first side to the second side, the diameter of the rotation axis 310 increases toward the second side and the pitch of the main wing 320 decreases toward the second side.

Thus, a valley portion forming an area between the main wing 320 and an outer surface of the rotation axis 310 has a depth gradually decreasing from the first side of the screw 300 to the second side of the screw 300. In addition, an inner diameter of the screen 200 is formed to correspond to the outer diameter of the screw 300, and thus the inner diameter of the screen 200 is uniform. Thus, a surface forming an outer end portion which is the outer diameter of the main wing 320, which is a surface forming an outside of the screw 300 along the radial direction, is disposed side by side with an inner surface of the screen 200.

Both ends of the rotation axis 310 may pass through the housing 100 and be outwardly disposed from the housing 100, and the first side and the second side of the rotation axis 310 may be rotatably coupled with the housing 100 with a bearing.

In addition, the main wing 320 has a relatively thin thickness and has a plate shape extending with a curved shape, and then the main wing 320 is formed into a spiral shape along a central axis of the rotation axis 310.

In the figure, the main wing 320 of the screw 300 has a quadruple spiral shape, but may have a single or more than double spiral shape. In addition, the rotation axis 310 and the main wing 320 are separately formed and then the rotation axis 310 and the main wing 320 are assembled with each other by a welding and so on, to form the screw 300. Further, various kinds of manufacturing process such as a machining, a molding and so on may be used for manufacturing the screw 300.

In addition, the rotation axis 310 of the screw 300 has a hollow shaft, and the plurality of moisture exhaust holes 230 penetrates from an inside of the rotation axis 310 to an outside of the rotation axis 310. Thus, the moisture may be exhausted into the inner space of the rotation axis 310 through the moisture exhaust holes 230 formed at the rotation axis 310, so that the dehydration of the livestock manure may be more effective.

The driving part 340 may be a motor configured to drive the screw 300, and may be coupled and fixed with the housing 100, a base and so on. A driving axis of the driving part 340 may be coupled with an end of the rotation axis 310 of the screw 300 via a coupling structure.

Then, the livestock manure A provided into the inlet part 110 of the housing 100 moves and is pressed from the first side to the second side by the rotation of the screw 300, and during the process, the moisture is dehydrated to be gathered in a storage tank. The dehydrated livestock manure B gets out through a gap between the rotation axis 310 and the screen 200 at the second side of the screw 300, and then is exhausted to outside through the outlet part 120 of the housing 100.

Since the moving cross-sectional area of the screw 300, which is an area in which the livestock manure A may exist, is formed to become narrower from the first side to the second side along the moving direction of the livestock manure A, the livestock manure A is more compressed as the livestock manure A moves toward the second side. Thus, the livestock manure A may be more easily dehydrated. Since the moving cross-sectional area of the screw 300 along both of the pitch direction and the radial direction decreases as the livestock manure A moves, a volume of the livestock manure A decreases and a squeezing effect occurs, and thus the dehydration of the livestock manure A may be maximized.

Here, at least one moisture content control wing 400 is formed on the rotation axis 310 adjacent to the outlet portion 250. The moisture content control wing 400 is only formed in an area adjacent to the outlet portion 250 of the screen 200 through which the dehydrated livestock manure B is exhausted. The moisture content control wing 400 is formed between the main wings 320 adjacent to each other, and is formed into a spiral shape along the extending direction of the main wing 320.

The moisture content control wing 400 is formed in a predetermined range from the second side of the rotation axis 310, and thus a length of the moisture content control wing 400 is relatively much smaller than that of the main wing 320.

The moisture content control wing 400 is formed at an end portion of the second side of the screw 300 which is adjacent to the outlet portion 250 of the screen 200. In addition, the moisture content control wing 400 is spaced apart from the main wing 320, and is disposed side by side with the main wing 320. Here, the moisture content control wing 400 may be parallel with the main wing 320, in the space between the main wings 320 adjacent to each other. In addition, an outer diameter of the moisture content control wing 400 which is a distance to an outmost end along the radial direction with respect to the central axis of the rotation axis 310, is substantially same as an outer diameter of the main wing 320.

Thus, degree of dehydration of the livestock manure A passing through and being dehydrated in the space between the screen 200 and the screw 300, may be controlled by the moisture content control wing 400 formed adjacent to the outlet portion. The moisture content control wing 400 may control moisture content of the livestock manure A which is dehydrated and exhausted toward the outlet part 120.

In addition, the screw 300 may be formed in a form in which two or more parts are coupled while going from the first side to the second side. As illustrated in FIG. 2, the screw 300 includes a first body 360 and a second body 370 connected to the first body 360. Here, the second body 370 may be detachably coupled with the first body 360.

An area in which the moisture content control wing 400 exists is included in the second body 370, and then is detachably coupled with the first body 360. That is, the moisture content control wing 400 may be detachably combined. In addition, as illustrated in FIG. 2, as for the first body 360, a portion corresponding to the inlet part 110 to which the livestock manure A is inputted may also be formed in a form of a detachable body 380.

Figure 3:
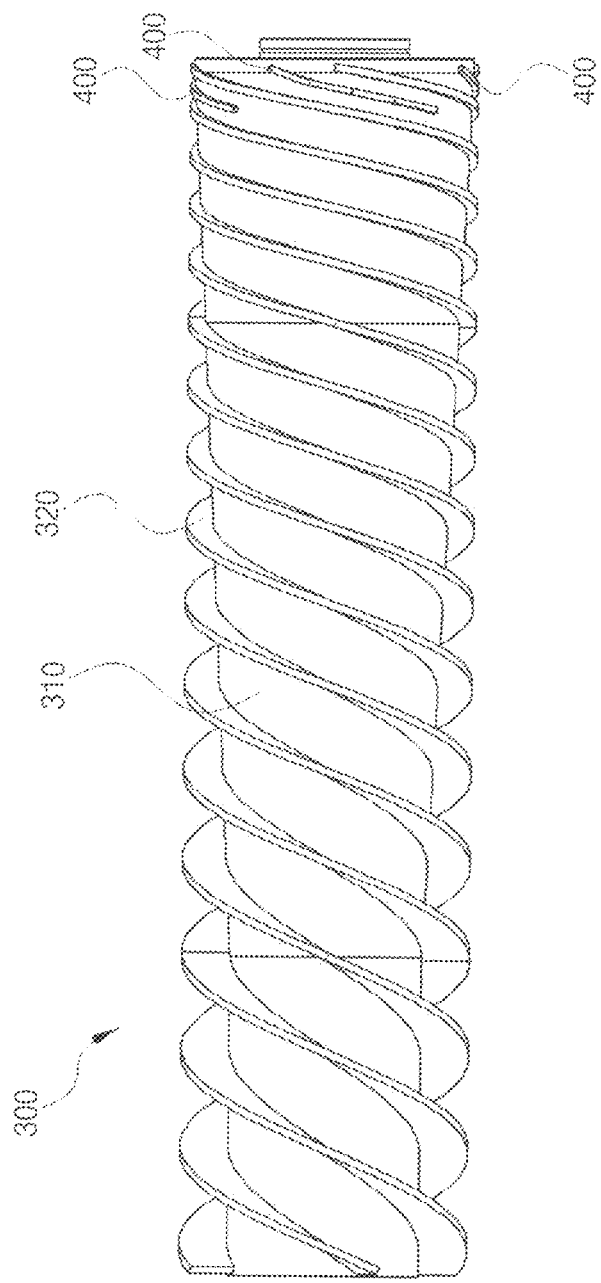
FIG. 3 is a front view illustrating the screw of FIG. 2.
Figure 4:
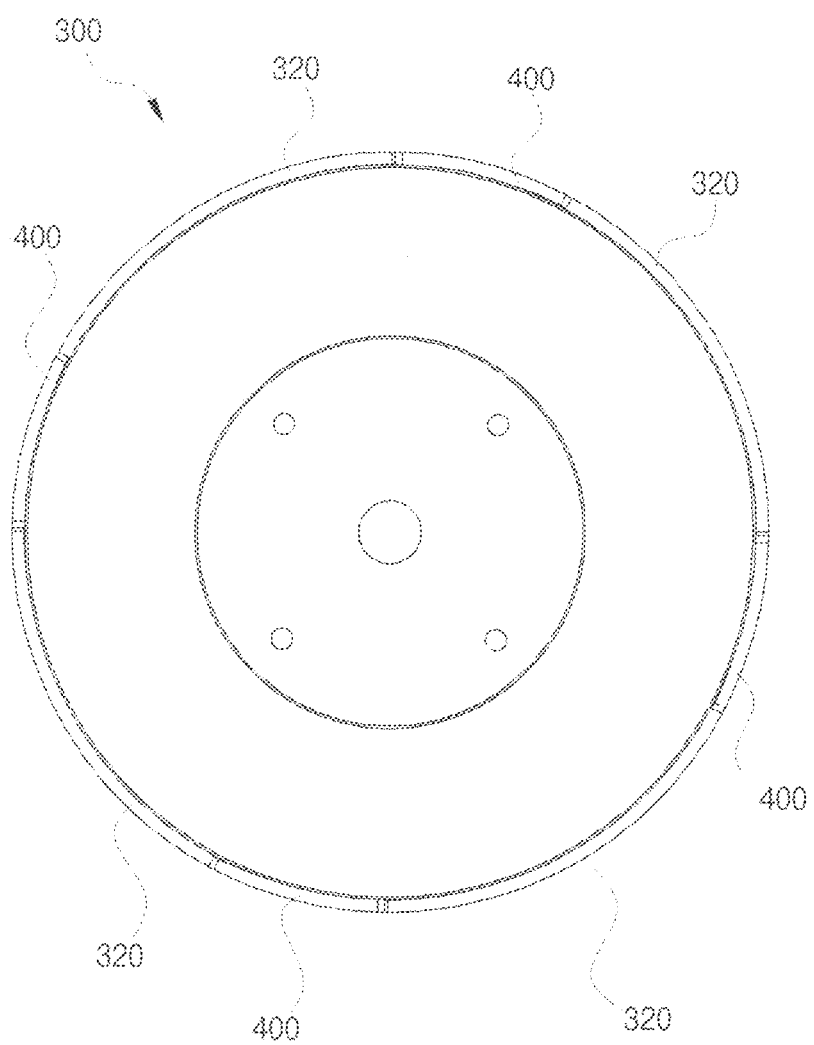
FIG. 4 is a right side view illustrating the screw of FIG. 2.
Figure 5:
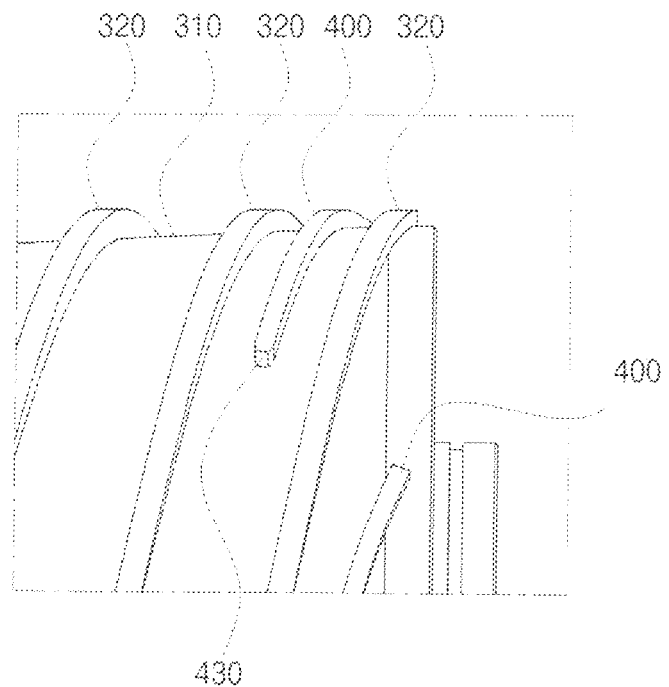
FIG. 5 is an enlarged view illustrating the screw of FIG. 2.

FIG. 3 is a front view illustrating the screw of FIG. 2, FIG. 4 is a right side view illustrating the screw of FIG. 2, and FIG. 5 is an enlarged view illustrating the screw of FIG. 2.

Referring to FIG. 3 and FIG. 4, the moisture content control wing 400 may be a plural, and here, the plurality of the moisture content control wings 400 may be spaced apart from each other along a circumferential direction of the screw 300.

As illustrated in the figure, the moisture content control wing 400 may be disposed between the main wings 320 adjacent to each other and extending in a spiral shape, and when the main wings 320 has a quadruple spiral extending structure, four moisture content control wings 400 may also be fixed to the main wings adjacent to each other.

In addition, referring to FIG. 5, the moisture content control wing 400 extends along the spiral direction, and extends in a shape of increasing width from the inlet portion 240 for the livestock manure A to the outlet portion 250 for the livestock manure A.

Here, both sides of an intro portion 430 which is a first end of the moisture content control wing 400 extending along the spiral direction are chamfered, and thus an interference of the intro portion 430 of the moisture content control wing 400 in moving the livestock manure A may be minimized and the livestock manure A may be easily flowed into the gap between the main wing 320 and the moisture content control wing 400.

Here, a ratio at which the width of the moisture content control wing 400 increases may be designed in various ways, and likewise, the degree of the chamfering may also be designed in various ways.

Figure 6:
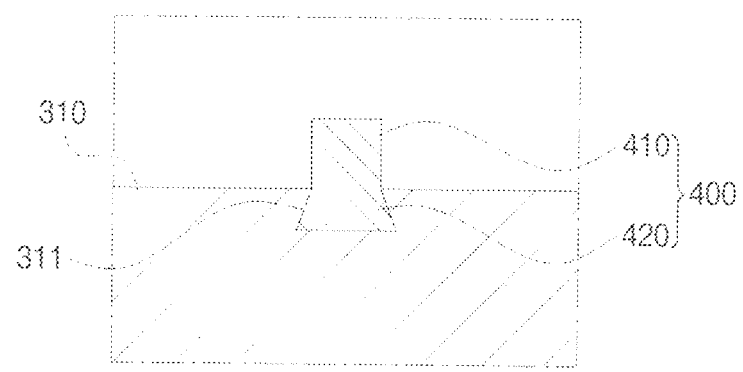
FIG. 6 is a cross-sectional view illustrating a coupling of a moisture content control wing in the screw of FIG. 2.

FIG. 6 is a cross-sectional view illustrating a coupling of a moisture content control wing in the screw of FIG. 2.

Referring to FIG. 6, the moisture content control wing 400 may be detachably coupled with the rotation axis 310 of the screw 300 in the dewatering machine 10. Thus, the moisture content control wing 400 may be easily changed according to required moisture content of the dehydrated livestock manure, and thus the moisture content of the dehydrated livestock manure may be easily controlled.

For example, a guide groove 311 may be concavely formed at the rotation axis 310 of the screw 300 along the spiral direction.

In addition, the moisture content control wing 400 may include a blade 410 and an inserted portion 420 extending from a side of the blade 410. Here, the inserted portion 420 of the moisture content control wing 400 may have a shape corresponding to the guide groove 311 of the rotation axis 310. Thus, the inserted portion 420 of the moisture content control wing 400 may be inserted, coupled, and fixed into the guide groove 311 of the rotation axis 310.

Here, the guide groove 311 has a width increasing from an inside toward an outside along the radial direction of the rotation axis 310, and thus the inserted portion 420 of the moisture content control wing 400 also has a width increasing from an inside toward an outside along the radial direction of the rotation axis 310. Thus, the inserted portion 420 of the moisture content control wing 400 may be inserted into the guide groove 311 along the spiral direction in which the guide groove 311 is formed. Accordingly, the moisture content control wing 400 may be easily coupled with and fixed to the rotation axis 310, and the moisture content control wing 400 may be tightly fixed to the rotation axis 310 without being detached.

Figure 7:
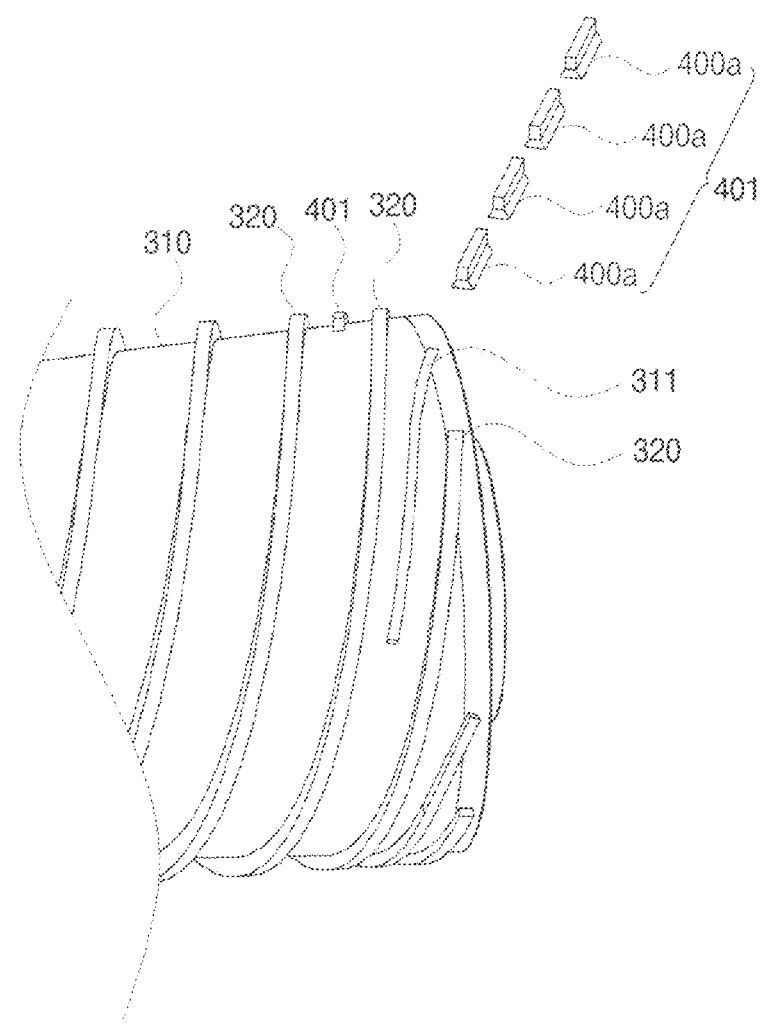
FIG. 7 is a partial enlarged view illustrating a screw and a moisture content control wing according to another example embodiment of the present invention.
Figure 8:
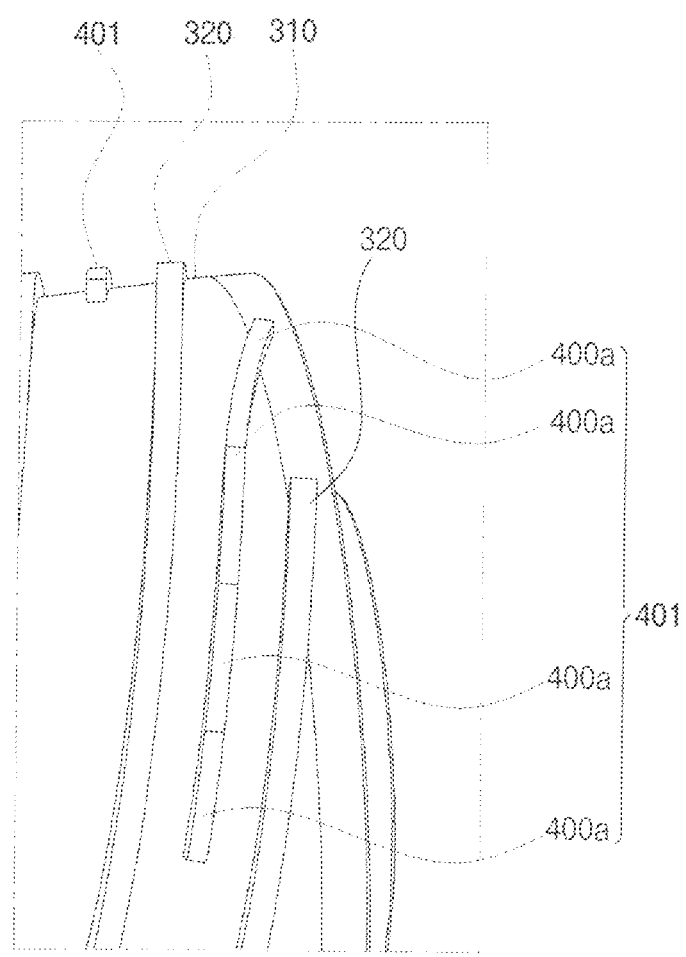
FIG. 8 is a partial enlarged view illustrating the moisture content control wing coupled to the screw of FIG. 7.

FIG. 7 is a partial enlarged view illustrating a screw and a moisture content control wing according to another example embodiment of the present invention, and FIG. 8 is a partial enlarged view illustrating the moisture content control wing coupled to the screw of FIG. 7.

A dewatering machine according to the present example embodiment is substantially same as the dewatering machine explained referring to FIG. 1 to FIG. 6, except for the moisture content control wing having at least one wing piece, and thus same elements may be used as same reference numerals and any repetitive explanation will be omitted.

Referring to FIG. 7, in the dewatering machine according to the present example embodiment, the moisture content control wing 401 includes at least one wing piece. That is, the moisture content control wing 401 may include a single wing piece. However, since the moisture content control wing is hard to be combined or fixed with the rotation axis 310 as the length of the moisture content control wing increases, the moisture content control wing 401 may include a plurality of the wing pieces connected with each other along the spiral direction of the rotation axis 310. Thus, the moisture content control wing 401 may be easily repaired, changed and detached.

Here, the number of the wing pieces of the moisture content control wing 401 may be selected variously.

For example, as illustrated in FIG. 7 and FIG. 8, four moisture content control wing pieces 400*a* at which the blade 410 and the inserted portion 420 are formed are combined with the guide groove 311 of the rotation axis 310, and thus the length of the moisture content control wing 401 may be formed much longer.

Here, the wing pieces 400*a* different from each other are tightly arranged, and thus the wing pieces 400*a* are fixed at the guide groove 311 without forming a space between the wing pieces 400*a* at the guide groove 311.

Figure 9:
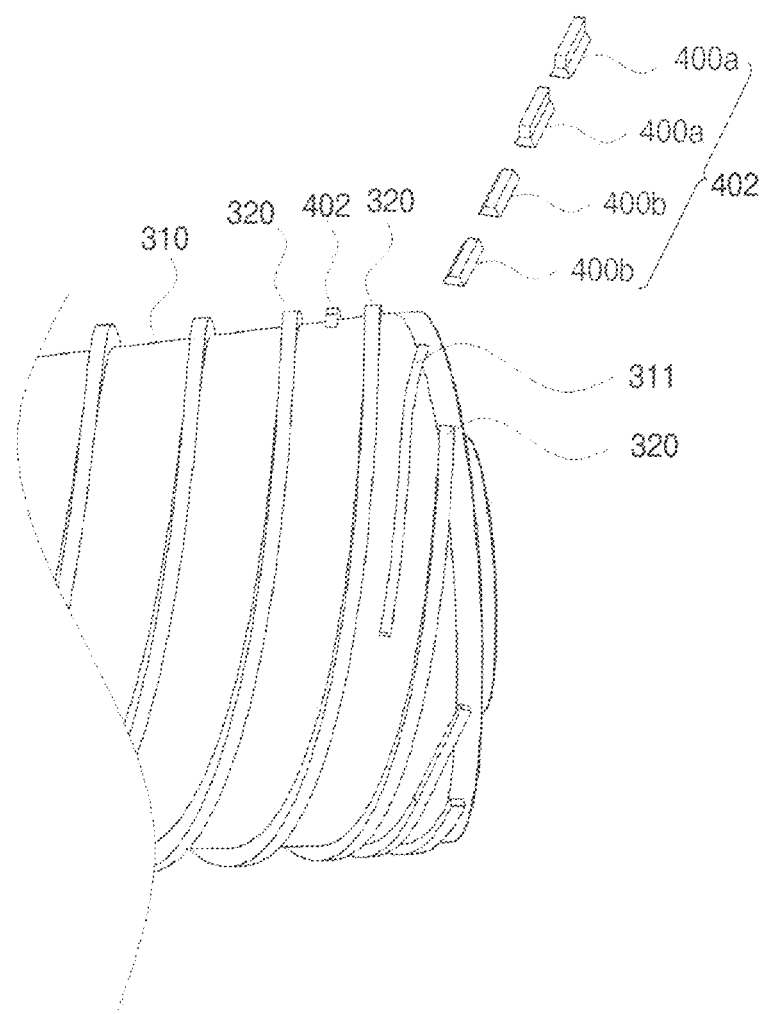
FIG. 9 is a partial enlarged view illustrating a screw and a moisture content control wing according to still another example embodiment of the present invention.
Figure 10:
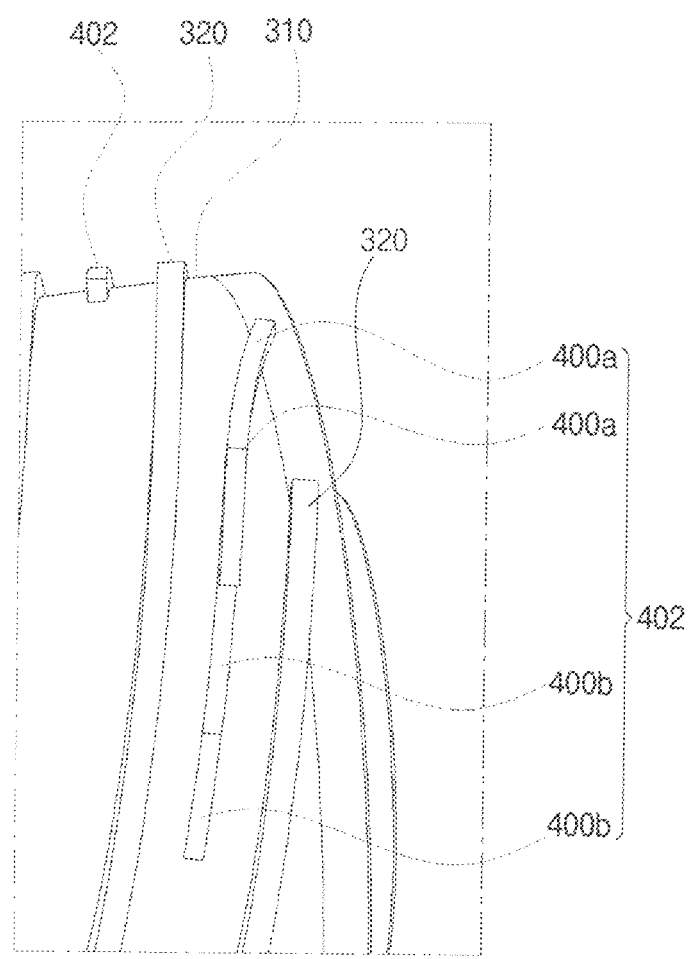
FIG. 10 is a partial enlarged view illustrating the moisture content control wing coupled to the screw of FIG. 9.

FIG. 9 is a partial enlarged view illustrating a screw and a moisture content control wing according to still another example embodiment of the present invention, and FIG. 10 is a partial enlarged view illustrating the moisture content control wing coupled to the screw of FIG. 9.

A dewatering machine according to the present example embodiment is substantially same as the dewatering machine explained referring to FIG. 1 to FIG. 6, except for the moisture content control wing having at least one wing piece and having at least one infill block, and thus same elements may be used as same reference numerals and any repetitive explanation will be omitted.

Referring to FIG. 9 and FIG. 10, in the dewatering machine according to the present example embodiment, the moisture content control wing 402 includes at least one moisture content control wing piece 400*a* and at least one infill block 400*b*.

In the present example embodiment, a total length of the moisture content control wing pieces 400*a* is shorter than that of the guide groove 311, and the moisture content control wing pieces 400*a* may be filled into the guide groove 311. For example, even though the guide groove 311 is formed to have a space for four moisture content control wing pieces 400*a*, two moisture content control pieces may be combined with the guide groove 311.

Here, the infill block 400*b* may be filled into the space of the guide groove 311 in which the wing pieces 400*a* are not inserted.

At least one infill block 400*b* may be additionally filled into the space of the guide groove 311 in which the wing pieces 400*a* are not inserted. Thus, the space of the guide groove 311 may be fully filled. Then, the wing pieces 400*a* may be prevented from moving at the space of the guide groove 311.

Here, at least one wing piece 400*a* may be filled into the space of the guide groove 311, and at least one infill block 400*b* may also be filled into the space of the guide groove 311.

Figure 11:
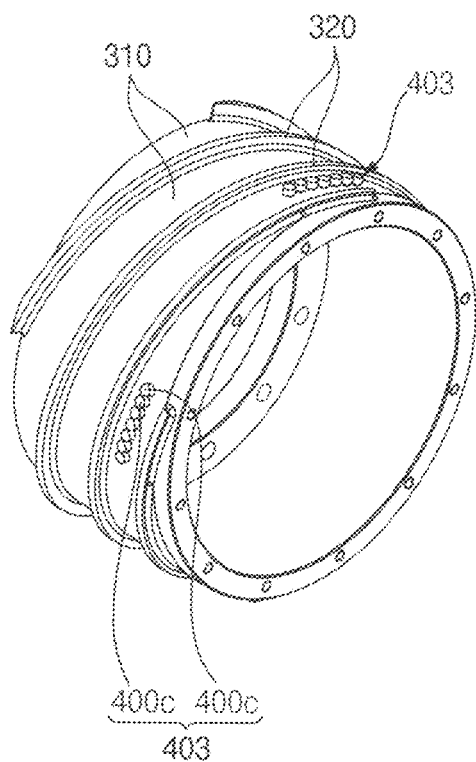
FIG. 11 is a partial enlarged view illustrating a moisture content control wing coupled to a screw according to still another example embodiment of the present invention.

FIG. 11 is a partial enlarged view illustrating a moisture content control wing coupled to a screw according to still another example embodiment of the present invention.

A dewatering machine according to the present example embodiment is substantially same as the dewatering machine explained referring to FIG. 1 to FIG. 6, except for the moisture content control wing having at least one variable pin 400*c*, and thus same elements may be used as same reference numerals and any repetitive explanation will be omitted.

Referring to FIG. 11, in the dewatering machine according to the present example embodiment, the moisture content control wing 403 includes at least one variable pin 400*c*.

In FIG. 11, seven variable pins 400*c* are illustrated, but at least one variable pin 400*c* is enough, and the number of the variable pins 400*c* may be changed according to the moisture content of the livestock manure.

As the number of the variable pins 400*c* increases, the moisture content included in the livestock manure decreases, and as the number of the variable pins 400*c* decreases, the moisture content included in the livestock manure increases. Thus, the number of the variable pins 400*c* may be changed variously according to the required moisture content of the livestock manure, or the moisture content included in the livestock manure.

Although not shown in the figure, the variable pin 400*c* may be fixed to the guide groove 311 formed at the rotation axis 310. Alternatively, an additional groove may be formed at the rotation axis 310, for the variable pin 400*c*.

Here, a size of the variable pin 400*c* may be smaller than that of the wing piece 400*a*.

Accordingly, the number of the variable pins 400*c* is controlled, to control the moisture content of the livestock manure, or the number of the variable pins 400*c* is controlled based on the moisture content included in the livestock manure.

Figure 12:
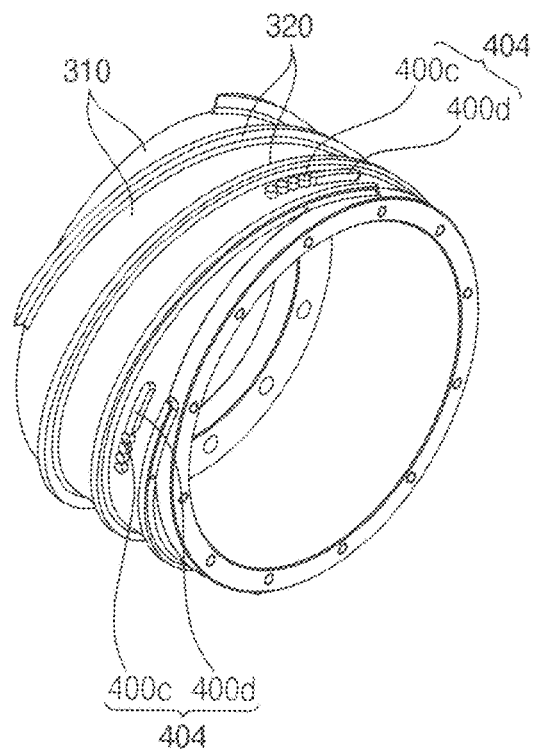
FIG. 12 is a partial enlarged view illustrating a moisture content control wing coupled to a screw according to still another example embodiment of the present invention.

FIG. 12 is a partial enlarged view illustrating a moisture content control wing coupled to a screw according to still another example embodiment of the present invention.

A dewatering machine according to the present example embodiment is substantially same as the dewatering machine explained referring to FIG. 11, except for the moisture content control wing having a fixing block 400*d* in addition to at least one variable pin 400*c*, and thus same elements may be used as same reference numerals and any repetitive explanation will be omitted.

Referring to FIG. 12, in the dewatering machine according to the present example embodiment, the moisture content control wing 404 includes the fixing block 400d in addition to at least one variable pins 400c.

As illustrated in FIG. 11, at least one variable pin 400c is coupled with the rotation axis 310, considering the moisture content of the livestock manure.

However, in the present example embodiment, basically the fixing block 400d is fixed to the rotation axis 310, and the variable pin 400c is additionally and selectively fixed to the rotation axis 310.

Since the fixing block 400d is basically fixed to the rotation axis 310 with basically controlling the moisture content of the livestock manure, at least one variable pin 400c may be additionally fixed considering the moisture content of the livestock manure.

Accordingly, with controlling the moisture content of the livestock manure basically, the variable pin 400c may be added considering the required moisture content of the livestock manure, or considering the moisture content included in the livestock manure.

Here, the variable pin 400c and the fixing block 400d may be fixed to the guide groove 311 formed at the rotation axis 310, as explained above. Alternatively, an additional groove may be formed for fixing the variable pine 400c and the fixing block 400d.

Figure 13:
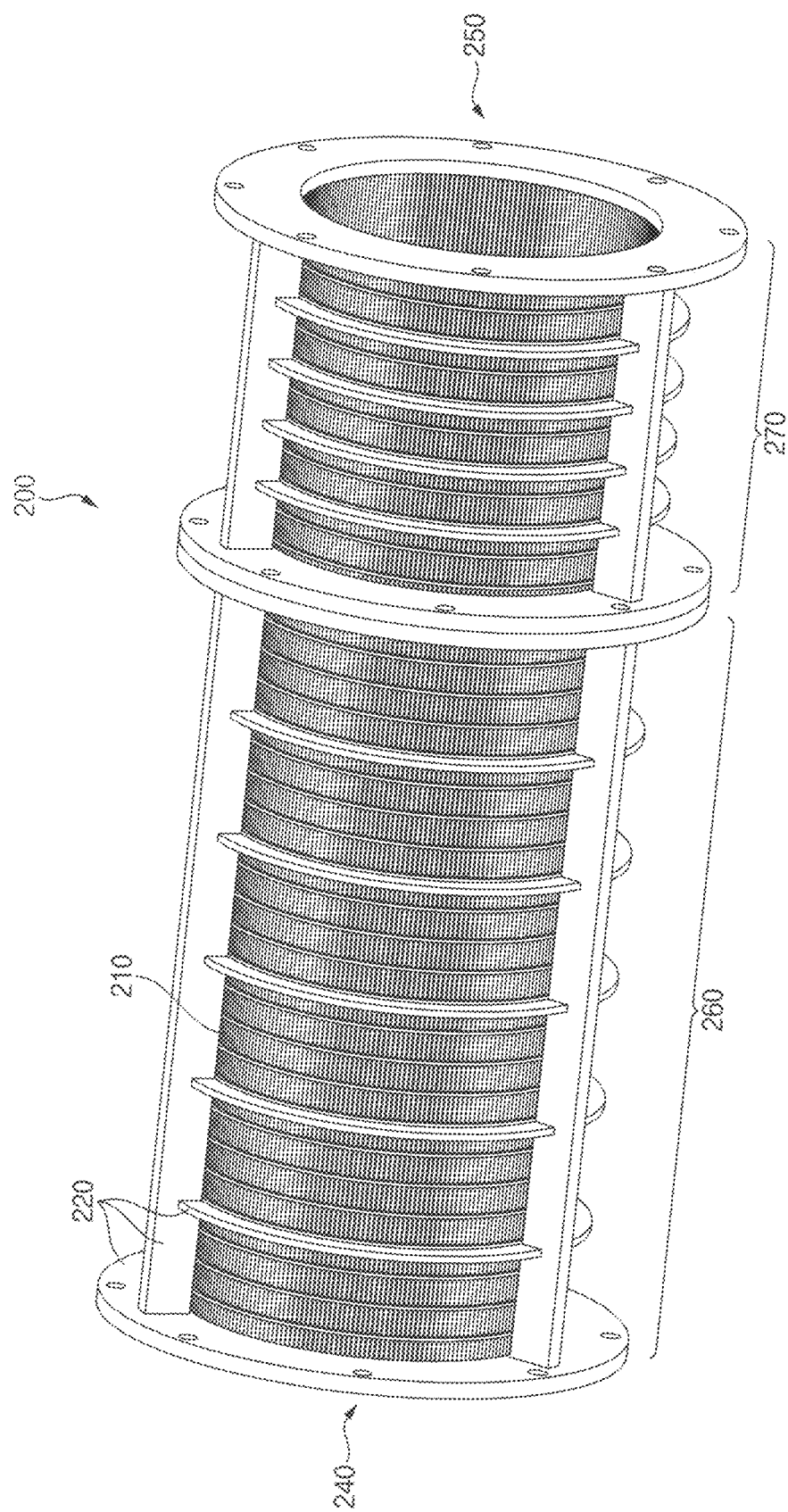
FIG. 13 is a perspective view illustrating a screen of FIG. 1.
Figure 14:
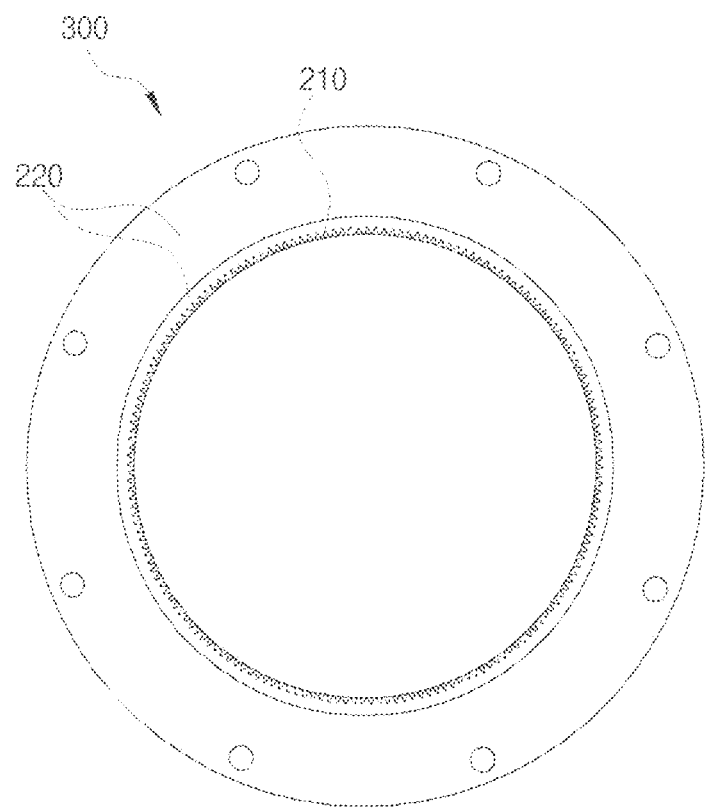
FIG. 14 is a side view illustrating the screen of FIG. 13.
Figure 15:
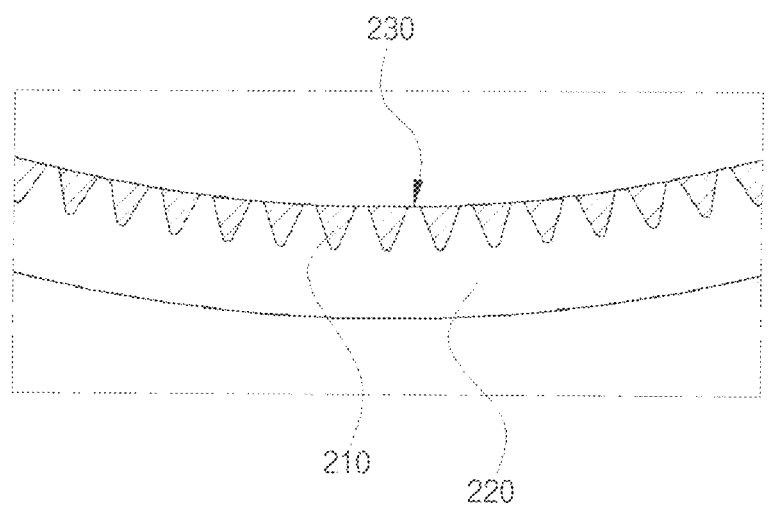
FIG. 15 is an enlarged cross-sectional view illustrating a partial exhaust hole formed in the screen of FIG. 13.

FIG. 13 is a perspective view illustrating a screen of FIG. 1, FIG. 14 is a side view illustrating the screen of FIG. 13, and FIG. 15 is an enlarged cross-sectional view illustrating a partial exhaust hole formed in the screen of FIG. 13.

Referring to FIG. 13, the screen includes a first body part 260 and a second body part 270. The first body part 260 is formed at outside of the first body 360 of the screw 300, and the second body part 270 is formed at outside of the second body 370 of the screw 300.

Here, the second body part 270 is detachably combined with the first body part 260, as explained above for the screw 300.

Accordingly, the second body 370 and the second body part 270 are detachably combined with the first body 360 and the first body part 260, and thus, a portion with a high need for repair in which the moisture content control wing 400, 401, 402 and 403 is disposed may be easily repaired and replaced. In addition, referring to FIG. 14 and FIG. 15, the screen 200 include a plurality of wedge wires 210 and a supporting part 220 combined with and fixing the wedge wires 210.

The wedge wire 210 may have a wire shape longitudinally extending along a direction from the inlet portion 240 of the housing 100 to the outlet portion 250 of the housing 100, and the plurality of wedge wires 210 may be spaced apart from each other in parallel along the circumferential direction.

The supporting part 220 has a supporting frame having a ring shape or a flange shape along the circumferential direction and the wedge wires 210 are combined at an outside of the supporting frame. A plurality of the supporting frames is spaced apart from each other from a first side to a second side, and then the wedge wires 210 are combined to the supporting frames.

In addition, a longitudinal frame connecting the plurality of the supporting frames is coupled with the supporting frame along the circumferential direction, and the a flange shape supporting frame is coupled at both ends of the inlet portion 240 and the outlet portion 250, to support the wedge wires 210 tightly.

Thus, moisture exhaust holes 230 are disposed at the space between the wedge wires 210, and the moisture exhaust hole 230 has a slot shape with a length longer than a width. Each of the moisture exhaust holes 230 extends with the slot shape along the extending direction of the screen 300, and the moisture exhaust holes 230 are space apart from each other along the circumferential direction of the screen 300.

The moisture exhaust holes 230 are formed as explained above, the moisture may be easily removed from the livestock manure having a fiber, and the dehydration may be effectively performed. In addition, the moisture exhaust hole may be prevented from being blocked by the fiber included in the livestock manure, and then the moisture content of the dehydrated livestock manure may be easily controlled.

Here, a cross-sectional shape of the wedge wire 210 of the screen 200 along the radial direction may be a triangle. The wedge wire 210 may be arranged so that one side is located radially inward and an opposite side thereof faces radially outward, in a cross-section of the triangular shape.

A width of the wedge wire 210 decreases from the inside to the outside in the radial direction, and thus the distance between the wedge wires adjacent to each other gradually increases. For example, the cross-sectional shape of the wedge wire 210 may be the triangle, and two edges of the wedge wire 210 may face the edge of the adjacent wedge wire 210, and the remaining one edge of the wedge wire 210 may be disposed to head for the outside along the radial direction.

Thus, dewatering urine, sludge or some solids which are exhausted from the inside of the screen 200 to the outside thereof, may be discharged more smoothly, and the moisture exhaust holes may be prevented or minimized from being blocked.

According to the embodiments of the present invention mentioned above, the dewatering machine may easily remove moisture from livestock manure having a fiber, and may easily control moisture content of dehydrated livestock manure.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A dewatering machine comprising:
a screen having a hollow inside, having an inlet portion through which livestock manure is inputted at a first side and an outlet portion through which dehydrated livestock manure is outputted at a second side, and having a plurality of moisture exhaust holes penetrating from an inside of the screen to an outside of the screen;
a screw comprising a rotation axis and a plurality of main wings, the main wings arranged in a spiral shape along a longitudinal direction of the rotation axis; and
a plurality of moisture content control wings disposed between the main wings adjacent to the outlet portion, the moisture content control wings extending in a spiral shape along the longitudinal direction of the rotation axis,
wherein each of the moisture content control wings has a predetermined length, such that the moisture content control wings do not overlap with each other along the longitudinal direction of the rotation axis,
wherein the moisture content control wings comprises at least three moisture content control wings spaced apart from each other when viewed along the longitudinal direction of the rotation axis, and a length of each of the moisture content control wings is less than ¼ of a length of an arc of the rotation axis of the screw.

2. The dewatering machine of claim 1, wherein each of the moisture content control wings is detachably coupled with the rotation axis.

3. The dewatering machine of claim 2, wherein each of the moisture content control wings is coupled with a guide groove which is concave along a spiral direction at the rotation axis.

4. The dewatering machine of claim 3, wherein each of the moisture content control wings comprises:
- a blade outwardly protruded from the rotation axis; and
- an inserted portion extending from the blade and inserted into the guide groove.

5. The dewatering machine of claim 4, wherein each of the guide groove and the inserted portion has a width increasing toward an inside of the rotation axis.

6. The dewatering machine of claim 3, wherein each of the moisture content control wings has at least one wing piece.

7. The dewatering machine of claim 6, wherein
- each of the moisture content control wings comprises at least one infill block, and
- the infill block fills a remaining space in the guide groove, after the wing piece is coupled with the guide groove.

8. The dewatering machine of claim 2, wherein each of the moisture content control wings comprises at least one variable pin, and a number of the at least one variable pin coupled with the rotation axis is changed considering moisture content of the livestock manure.

9. The dewatering machine of claim 8, wherein
- each of the moisture content control wings further comprises a fixing block fixed to the rotation axis, and
- the at least one variable pin is added to the fixing block, to be coupled with the rotation axis, with changing the number of the at least one variable pin considering the moisture content of the livestock manure.

10. The dewatering machine of claim 1, wherein the moisture content control wings is spaced apart from each other along a circumferential direction.

11. The dewatering machine of claim 1, wherein
- the screw comprises a first body and a second body detachably coupled with the first body, and
- the second body comprises a rotation axis to which the moisture content control wings are coupled.

12. The dewatering machine of claim 1, wherein
- each of the moisture exhaust holes extends with a slot shape along an extending direction of the screen, and
- the moisture exhaust holes are spaced apart from each other along a circumferential direction of the screen.

13. The dewatering machine of claim 12, wherein the screen comprises:
- a plurality of wedge wires extending along the extending direction of the screen and spaced apart from each other along the circumferential direction of the screen; and
- a supporting part configured to fix the wedge wires with each other.

14. The dewatering machine of claim 13, wherein a width of each of the wedge wires decreases from an inside toward an outside of the supporting part in a radial direction.

15. The dewatering machine of claim 14, wherein a cross-sectional shape of at least one of the wedge wires is a triangle, and one side of the triangle is at an inside of the supporting part along the radial direction.

* * * * *